Figure 1:
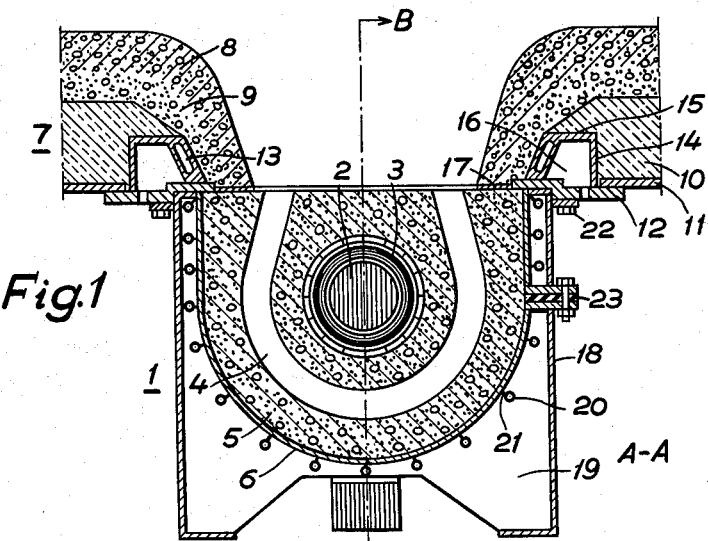

Aug. 6, 1963 M. RYDINGER ETAL 3,100,237
LOW FREQUENCY INDUCTION FURNACE OF THE
MELTING CHANNEL TYPE
Filed April 28, 1961

INVENTOR.
Mats Rydinger
Bengt Fredriksson
BY
Bailey, Stephenson & Huettig
ATTORNEYS

United States Patent Office 3,100,237
Patented Aug. 6, 1963

3,100,237
LOW FREQUENCY INDUCTION FURNACE OF THE MELTING CHANNEL TYPE
Mats Rydinger and Bengt Fredriksson, both of Vasteras, Sweden, assignors to Allmanna Svenska Elektriska Aktiebolaget, Vasteras, Sweden, a Swedish corporation
Filed Apr. 28, 1961, Ser. No. 106,356
Claims priority, application Sweden May 21, 1960
5 Claims. (Cl. 13—26)

Melting and holding furnaces with inductor units of the melting channel type which are replaceably attached to the furnace body have been used more and more in iron foundries for keeping the melt warm and for over-heating and analyzing it. These so-called mixers may be fed with molten iron from melting furnaces of various design. The mixers are particularly useful due to their low costs and good efficiency. The sensitive part of the mixers is the lining in the inductor units which are attached to the furnace body and the life of which in most cases determines when the brickwork of the furnace body has to be renewed.

The term "mixer," used in the following, refers substantially to cylindrical holding furnaces which rest on rollers and are rotated together with the melt contained therein. The invention, however, is not to be limited to means of this type.

The present invention makes it possible, without emptying the mixer, to rapidly remove the inductor units attached independent of the physical properties of the melt. If furnaces are concerned for metals having low melting and over-heating temperatures the exchange of the inductor units does not involve particular difficulties. However, if it is a question of metals having high melting and over-heating temperatures such as for instance iron, the difficulties arise in making a tight attachment between the furnace body and the induction unit or units completely tight and in obtaining a joint which is so reliable that no risk will occur of the lining material of the furnace body and the inductor unit sintering together. Should such a sintering occur, the contact faces of the lining of the furnace body are damaged when the inductor unit is removed so that the attachment of a new inductor unit becomes difficult, if not in fact impossible. For melts having low melting and overheating temperatures, bricks are used as lining material for the furnace body, and powdered ceramic material with or without a binder for the inductor units.

When melting metals of high melting and overheating temperatures, the said brick material cannot be employed in the vicinity of the joint, for this material would not fulfil the special requirements imposed in this connection. The lining has to tolerate heavy stresses such as erosion due to the rotating melt, and it must have a hard and tight surface against the melt. On the other hand, however, the layer may not be continuous, firstly so that crevices possibly occurring in this layer will not spread over the entire lining, and secondly because an outwardly yielding layer having less heat conductivity is desired. Due to these heterogeneous requirements it is impossible to make use of the joining methods hitherto known.

By the construction which is the object of the present invention the above demands are fulfilled and it is possible to remove worn inductor units without the risk that sintering phenomena will occur. The exchange may be made without having to empty the mixer regardless of the physical properties of the melt.

The invention comprises a combination of means which contribute to the desired result.

According to one feature of the invention the lining of the furnace body consists at least at the joint between the furnace body and the inductor unit or units of an inner sintered layer of heat resistant ceramic material and of an outer layer, preferably of the same material in non-sintered state, that is, in a state (powdered or granulated) in which the material has no tendency to crack. The lining for the inductor units consists of normal heat resistant ceramic material.

According to a second feature of the invention the outer layer of the lining of the furnace body is reinforced at the contact faces with each inductor unit by means of a ring-shaped plate which takes up the pressure force from the inductor units and supports a substantially axially extended cooling channel having preferably rectangular cross-section, which channel engages the outer face of the outer layer.

A third feature is that the casing embracing the lining of the inductor unit is provided with ring-shaped cooling channels and that the channel nearest the joint is adapted to concentrate the cooling effect towards the joint.

A further feature is that between the lining of the furnace body and the lining of the inductor unit there is inserted a material which prevents the linings of the furnace body and of the inductor units from sintering together and which prevents chemical reactions between the heavy melting metal and both lining materials. Such a joint material is chrome spinel. Thereby it will be possible to use basic material in one part of the furnace and acid material in the other part thereof.

Figure 2:
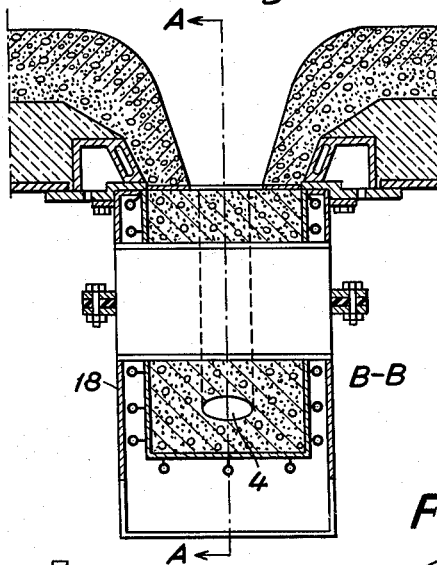
Figure 3:
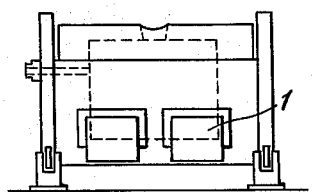

In the following, one example of an embodiment of the present invention will be described with reference to the accompanying drawing in which FIGURE 1 is a section through an inductor unit along the line A—A in FIGURE 2 and through a portion of the lining of the furnace body, and FIGURE 2 is a section along the line B—B in FIGURE 1, the core and coil being removed. FIGURE 3 is a side view and FIGURE 4 a front view of a holding furnace in question.

The inductor unit 1 has, as usual, an iron core 2, a coil 3, a melting channel 4, a lining 5 and a casing 6. Only a small part of the furnace body 7 is shown. The lining of the furnace body consists of an inner layer 8 of heat resistant sintered ceramic material and an outer layer 9 of non-sintered material in powdered form. An insulating mantle 10 of conventional ceramic material encloses the outer layer 9 and is enclosed in turn by a metallic casing 11.

The outer layer 9 is reinforced by a ring-shaped plate 12 which supports a ring-shaped cooling channel 13 which is engaged by the outer layer 9. This cooling means has the purpose of cooling that part of the outer layer of the lining which lies near the joint between the furnace body and the inductor unit. The cooling channel 13, the plate 12 and an outer wall 14 and ceiling 15 form a space 16 which serves as a drainage channel for condensed water from the cooling channel 13 and for water possibly leaking therefrom. Between the lining of the furnace body and the inductor unit is inserted a layer 17 of chrome spinel for example.

The casing 6 on the inductor unit is surrounded by a mantle 18 so that a space 19 is formed which supports the inductor unit when removed from the furnace body, and which also serves as a drainage chamber. There are several cooling pipes 20 which are attached by lugs 21 to the casing 6. The uppermost cooling pipe concentrates, as will be seen, the cooling effect to the joint between the furnace body and the inductor unit. The latter is fixed to the furnace body by means of screws 22. The coaction of the cooling channel 13 of the layer 17 and the upper cooling pipe or pipes 20 reliably prevent the linings from sintering together. In order to obviate a short-circuited secondary loop in the casing 6 and mantle 18 these parts are interrupted by an insulated gap 23 which is positioned below the zone of concentrated cooling.

Figure 4:
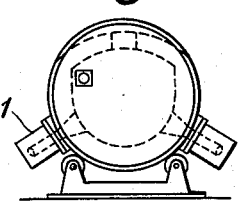

In the simplified sketch FIGURES 3 and 4, two attached inductor units 1 and means for rotating the holding furnace are shown.

What we claim is:

1. Low frequency induction furnace comprising a furnace body for the melt having a metallic casing, a lining of heat resistant material on the inside of the wall of the casing, and at least one inductor unit replaceably attached to the furnace body, said inductor unit comprising a metallic casing, a lining of heat resistant material on the inside of the wall of the inductor unit casing, an electric circuit, and an iron core, the lining of the furnace body comprising at least at and in the vicinity of the joint between the furnace body and the inductor unit an inner sintered layer of heat resistant material and an outer layer of material in non-sintered state, reinforcing means secured in the lining of the furnace body on its side facing the inductor unit for taking up the pressure force from the inductor unit against the lining of the furnace body, the reinforcing means including cooling channel means engaging the outer face of the non-sintered layer of the furnace body lining, cooling means surrounding at least the upper part of the metallic casing of the inductor unit.

2. In a frequency induction furnace according to claim 1, a layer of material of high heat resistivity between the lining of the furnace body and the lining of the inductor unit for preventing the said linings from sintering together.

3. In a furnace as claimed in claim 2, said layer being of chrome spinel.

4. In a low frequency induction furnace according to claim 1, a drainage channel for leakage and condensate from the cooling means which engages the outer face of the outer layer, said drainage channel being enclosed by the outer wall of the said cooling means, the reinforcing means, and by an upper and a side wall.

5. In a low frequency induction furnace according to claim 1, a mantle for supporting the inductor unit when removed from the furnace body surrounding the casing in spaced relation thereto.

References Cited in the file of this patent

UNITED STATES PATENTS 1,862,293    Brace    June 7, 1932